United States Patent
Han et al.

(10) Patent No.: US 10,624,129 B2
(45) Date of Patent: Apr. 14, 2020

(54) TRANSMISSION CONTROL METHOD AND APPARATUS FOR AVOIDING DATA COLLISION

(71) Applicant: ZTE CORPORATION, Guangdong (CN)

(72) Inventors: Zhiqiang Han, Guangdong (CN); Zhenya Zhang, Guangdong (CN); Ronghui Hou, Guangdong (CN); Kaiying Lv, Guangdong (CN); Bo Sun, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 27 days.

(21) Appl. No.: 15/744,490

(22) PCT Filed: Jun. 15, 2016

(86) PCT No.: PCT/CN2016/085902
§ 371 (c)(1),
(2) Date: Jan. 12, 2018

(87) PCT Pub. No.: WO2017/016338
PCT Pub. Date: Feb. 2, 2017

(65) Prior Publication Data
US 2018/0213567 A1 Jul. 26, 2018

(30) Foreign Application Priority Data
Jul. 24, 2015 (CN) .......................... 2015 1 0443007

(51) Int. Cl.
*H04W 74/08* (2009.01)
*H04B 17/318* (2015.01)
(Continued)

(52) U.S. Cl.
CPC ...... *H04W 74/0816* (2013.01); *H04B 17/318* (2015.01); *H04W 72/044* (2013.01); *H04W 74/002* (2013.01)

(58) Field of Classification Search
None
See application file for complete search history.

(56) References Cited

U.S. PATENT DOCUMENTS 8,233,462 B2 * 7/2012 Walton .............. H04W 74/0808
370/338
8,395,997 B2 * 3/2013 Banerjea ............... H04W 72/04
370/241
(Continued)

FOREIGN PATENT DOCUMENTS

| CN | 102595517 A | 7/2012 |
| CN | 104284441 A | 1/2015 |
| EP | 2849526 A2 | 3/2015 |

OTHER PUBLICATIONS

International Search Report dated Aug. 24, 2016 issued in PCT/CN2016/085902.

*Primary Examiner* — Gregory B Sefcheck
(74) *Attorney, Agent, or Firm* — Li & Cai Intellectual Property (USA) Office

(57) ABSTRACT

Transmission control methods and devices for avoiding data collision are provided. According to the methods, a first radio frame is generated by a first station. The first radio frame includes a physical layer preamble, a null instruction information domain and a data section. The null instruction information domain is used for triggering an access point in another basic service set. The basic service set receives the first radio frame to send a second radio frame. The second radio frame indicates a time for reserving a channel. According to the methods, the first radio frame is sent by the first station.

17 Claims, 11 Drawing Sheets

(51) Int. Cl.
 *H04W 72/04* (2009.01)
 *H04W 74/00* (2009.01)

(56) References Cited

U.S. PATENT DOCUMENTS

| | | | | |
|---|---|---|---|---|
| 8,743,851 | B2* | 6/2014 | Banerjea | H04W 72/04 |
| | | | | 370/338 |
| 9,072,101 | B2* | 6/2015 | Walton | H04W 74/00 |
| 9,473,981 | B2* | 10/2016 | Bhushan | H04W 76/15 |
| 9,565,593 | B2* | 2/2017 | Bhushan | H04W 76/15 |
| 9,629,169 | B2* | 4/2017 | Zhang | H04W 28/0236 |
| 9,713,035 | B2* | 7/2017 | Bhushan | H04W 76/15 |
| 9,717,098 | B2* | 7/2017 | Bhushan | H04W 76/15 |
| 9,723,516 | B2* | 8/2017 | Bhushan | H04W 76/15 |
| 9,730,105 | B2* | 8/2017 | Bhushan | H04W 76/15 |
| 9,806,868 | B2* | 10/2017 | Lee | H04L 5/0055 |
| 10,015,821 | B2* | 7/2018 | Oteri | H04W 74/0816 |
| 10,080,240 | B2* | 9/2018 | Choi | H04W 74/0816 |
| 10,128,999 | B2* | 11/2018 | Gidvani | H04L 5/0055 |
| 10,154,437 | B2* | 12/2018 | Bhushan | H04W 76/15 |
| 10,362,603 | B2* | 7/2019 | Barriac | H04W 74/0816 |
| 2014/0029499 | A1 | 1/2014 | Chu et al. | |
| 2016/0088618 | A1* | 3/2016 | Barriac | H04W 74/0816 |
| | | | | 370/329 |
| 2017/0294949 | A1* | 10/2017 | Zhang | H04B 7/0617 |

* cited by examiner

| conventional physical layer preamble | signaling field | null instruction information domain | short training sequence domain | long training sequence domain | data section |

Fig.10

TRANSMISSION CONTROL METHOD AND APPARATUS FOR AVOIDING DATA COLLISION

CROSS-REFERENCE TO RELATED APPLICATION

This application is based upon and claims priority to PCT Application No. PCT/CN2016/085902, filed Jun. 15, 2016, which is based upon and claims priority to Chinese Patent Application No. 201510443007.5, filed Jul. 24, 2015, the entire contents of which are incorporated herein by reference.

TECHNICAL FIELD

The present disclosure relates to, but not limited to, the wireless communication filed, and more particularly to transmission control methods and devices for avoiding data collision.

BACKGROUND

At present, data communications using Wireless Local Area Networks (WLANs) have become very common, and the demand for WLAN coverage across the world is increasing. The Institute of Electrical and Electronic Engineers (IEEE) industry standard 802.11 group has defined a series of standards such as 802.11a/b/g/n/ac to meet the increasing communication needs.

In an Orthogonal Frequency Division Multiplexing (OFDM) system, the basic structure of a radio frame is shown in FIG. 1. The radio frame includes two parts: a physical layer preamble and a data section. The physical layer preamble includes a preamble compatible with traditional equipment, a short training domain, a long training domain, a signaling field and so on. To reduce the overhead, the IEEE 802.11 protocol defines a Null Data Packet (NDP), which refers to a physical layer packet that contains only the physical layer preamble but does not contain the data section.

The basic architecture of a WLAN may refer to a Basic Service Set (BSS), including an Access Point (AP) and multiple stations (STAs) associated with the AP, as shown in FIG. 2.

If working areas of access points in two BSSs overlap and the operating frequency bands used by the access points/stations are the same or overlap, the two BSSs are called as Overlapping Basic Service Set (OBSS).

When multiple wireless stations share channels, conflict detection in the wireless environment becomes very difficult. One of the major problems is hidden stations. Referring to FIG. 3, a station A sends data to a station B, and at the same time a station C also sends data to the station B. Because both station C and station A are outside the coverage of each other, simultaneous sending of data from station A and station C will lead to conflict. From the station A's perspective, the station C is a hidden station. In order to solve the problem of hidden stations, IEEE 802.11 proposed a virtual channel detection mechanism which avoids the collision of hidden stations by including a time for reserving a channel in the frame header of a radio frame. Other listening stations that receive the radio frame containing the time information for reserving the channel set a locally stored Network Allocation Vector (NAV), the value of NAV is set as the maximum of the time for reserving the channel and reserved time information. During this time, the listening stations will not send data, so as to avoid channel competition with the hidden stations and thereby collision. After NAV is reduced to zero, other stations can send data. In addition, before sending of big data, the sending party can send a Request to send (RTS) to make a channel reservation, which includes the time for reserving the channel. The receiving party feeds back a Clear to Send (CTS) to acknowledge the channel reservation, which also includes the time for reserving the channel, so as to protect the radio frame(s) subsequently sent by the sending party. As shown in FIG. 4, the time length between the time point when the sending of the RTS is completed and the time point when sending of the CTS begins, the time length between the time point when the sending of the CTS is completed and the time point when the sending of data begins, and the time length between the sending of the data is completed and the time point when the sending of ACK (acknowledgement) begins are all short interframe space (SIFS). For other stations, the NAV of the RTS is the time length between the time point when the sending of the RTS is completed and the time point when the sending of the ACK is completed, and the NAV of the CTS is the time length between the time point when the sending of the CTS is completed and the time point when the sending of the ACK is completed.

In addition, as WLAN deployment becomes more and more intensive, collision between BSSs is getting worse and worse, and OBSS problem is more and more serious. Referring to FIG. 5, a station A and an access point A belong to a basic service set A, a station B and an access point B belong to a basic service set B, and the basic service set A and the basic service set B are OBSS. If the station A competes for the channel to send data to the access point A, since the station A and the station B are hidden stations for each other, the station B may continue to compete for the channel to send data at this time. If the station B sends data during the sending of data from the station A, data collision will occur. The access point B cannot correctly receive the radio frame from the station B at this time, and the current transmission and receiving of the station A can be influenced.

This section provides background information related to the present disclosure which is not necessarily prior art.

SUMMARY

The following is a summary of the subject matters which will be described in detail below. The summary is not intended to limit the scope as defined by claims.

Embodiments of the present disclosure provide transmission control methods and devices for avoiding data collision in order to reduce collision and thereby guarantee reliability of current transmission.

There is provided a transmission control method for avoiding data collision. The method includes the following steps.

A first station generates a first radio frame which includes a physical layer preamble, a null instruction information domain and a data section. The null instruction information domain is used for triggering an access point in another basic service set which receives the first radio frame to send a second radio frame which indicates a time for reserving a channel.

The first station sends the first radio frame.

According to an exemplary embodiment, the physical layer preamble in the first radio frame includes at least one of information indicating whether the null instruction information domain is carried, a length of the null instruction information domain, and a starting position of the null instruction information domain.

According to an exemplary embodiment, a power in the null instruction information domain is the same with or different from a power in a part of the first radio frame other than the null instruction information domain.

According to an exemplary embodiment, the null instruction information domain is invalid data for a destination station of the first radio frame.

According to an exemplary embodiment, the null instruction information domain is located between the physical layer preamble and the data section of the first radio frame, or between a signaling field and a short training sequence domain of the physical layer preamble of the first radio frame.

According to an exemplary embodiment, the physical layer preamble of the first radio frame indicates duration of the first radio frame;

a stopping time of the time indicated by the second radio frame for reserving the channel is the same with a stopping time of the first radio frame.

According to an exemplary embodiment, the physical layer preamble in the first radio frame indicates the time for reserving the channel;

a stopping time of the time indicated by the second radio frame for reserving the channel is the same with a stopping time of the time indicated by the first radio frame for reserving the channel.

According to an exemplary embodiment, before the generation of the first radio frame by the first station, the method further includes:

detecting, by the first station, a signal strength of the another basic service set, and if the signal strength of the another basic service set exceeds a first preset threshold, performing the step of generating the first radio frame.

There is further provided a transmission control method for avoiding data collision. The method includes the following steps.

An access point in an overlapping basic service set receives a first radio frame sent by a station.

If the first radio frame carries a null instruction information domain and is a radio frame belonging to another basic service set, the access point sends a second radio frame after a particular time interval after starting of the null information instruction information domain of the first radio frame. The second radio frame indicates a time for reserving a channel.

According to an exemplary embodiment, before sending, by the access point, a second radio frame after a particular time interval after starting of the null information instruction domain of the first radio frame, the method further includes:

detecting, by the access point, a signal strength of the received first radio frame, and if the strength of the first radio frame exceeds a second preset threshold, performing the step of sending the second radio frame after a particular time interval after starting of the null information instruction domain of the first radio frame.

According to an exemplary embodiment, the second radio frame is a CTS-TO-SELF frame.

According to an exemplary embodiment, the second radio frame is a physical layer signaling frame.

According to an exemplary embodiment, a stopping time of the time indicated by the second radio frame for reserving the channel is the same with a stopping time of the first radio frame, or a stopping time of the time indicated by the second radio frame for reserving the channel is the same with a stopping time of the time indicated by the first radio frame for reserving the channel.

According to an exemplary embodiment, receiving identification carried in the second radio frame is broadcast identification or identification of the access point.

There is further provided a transmission control device for avoiding data collision. The device is provided in a first station, and includes a processor, a memory and a first wireless transmission chip. The memory stores instructions executable by the processor.

The processor is configured to generate a first radio frame which includes a physical layer preamble, a null instruction information domain and a data section. The null instruction information domain is used for triggering an access point in another basic service set which receives the first radio frame to send a second radio frame which indicates a time for reserving a channel.

The first wireless transmission chip is configured to send the first radio frame.

According to an exemplary embodiment, the physical layer preamble in the first radio frame includes at least one of information indicating whether the null instruction information domain is carried, a length of the null instruction information domain, and a starting position of the null instruction information domain.

According to an exemplary embodiment, a power in the null instruction information domain is the same with or different from a power in a part of the first radio frame other than the null instruction information domain.

According to an exemplary embodiment, the null instruction information domain is invalid data for a destination station of the first radio frame.

According to an exemplary embodiment, the null instruction information domain is located between the physical layer preamble and the data section of the first radio frame, or between a signaling field and a short training sequence domain of the physical layer preamble of the first radio frame.

According to an exemplary embodiment, the physical layer preamble of the first radio frame indicates duration of the first radio frame;

a stopping time of the time indicated by the second radio frame for reserving the channel is the same with a stopping time of the first radio frame.

According to an exemplary embodiment, the physical layer preamble in the first radio frame indicates the time for reserving the channel;

a stopping time of the time indicated by the second radio frame for reserving the channel is the same with a stopping time of the time indicated by the first radio frame for reserving the channel.

According to an exemplary embodiment, the processor is further configured to detect a signal strength of the another basic service set;

if the signal strength of the another basic service set exceeds a first preset threshold, perform an operation of generating the first radio frame.

There is further provided a transmission control device for avoiding data collision. The device is provided in an access point in an overlapping basic service set, and includes a processor, a memory storing instructions executable by the processor, and a second wireless transmission chip.

The second wireless transmission chip is configured to receive a first radio frame sent by a station.

The processor is configured to, if the first radio frame carries a null instruction information domain and is a radio frame belonging to another basic service set, instruct the second wireless transmission chip to send a second radio frame after a particular time interval after starting of the null information instruction domain of the first radio frame. The second radio frame indicates a time for reserving a channel.

The processor is further configured to detect a signal strength of the received first radio frame;

if the strength of the first radio frame exceeds a second preset threshold, perform an operation of sending the second radio frame after a particular time interval after starting of the null information instruction domain of the first radio frame.

According to an exemplary embodiment, the second radio frame is a CTS-TO-SELF frame.

According to an exemplary embodiment, the second radio frame is a physical layer signaling frame.

According to an exemplary embodiment, a stopping time of the time indicated by the second radio frame for reserving the channel is the same with a stopping time of the first radio frame, or a stopping time of the time indicated by the second radio frame for reserving the channel is the same with a stopping time of the time indicated by the first radio frame for reserving the channel.

According to an exemplary embodiment, receiving identification carried in the second radio frame is broadcast identification or identification of the access point.

There is provided a radio frame structure, including a physical layer preamble, a null instruction information domain and a data section.

The null instruction information is used for triggering an access point in another basic service set which receives the radio frame to send a second radio frame which indicates a time for reserving a channel.

According to an exemplary embodiment, the physical layer preamble in the first radio frame includes at least one of information indicating whether the null instruction information domain is carried, a length of the null instruction information domain, and a starting position of the null instruction information domain.

According to an exemplary embodiment, a power in the null instruction information domain is the same with or different from a power in a part of the first radio frame other than the null instruction information domain.

According to an exemplary embodiment, the null instruction information domain is invalid data for a destination station of the radio frame.

According to an exemplary embodiment, the null instruction information domain is located between the physical layer preamble and the data section of the radio frame, or between a signaling field and a short training sequence domain of the physical layer preamble of the radio frame.

According to an exemplary embodiment, the physical layer preamble of the radio frame indicates duration of the radio frame.

According to an exemplary embodiment, the physical layer preamble in the radio frame indicates the time for reserving the channel.

A computer-readable storage medium for storing computer executable instructions which when executed, perform the above methods.

In the transmission control methods and devices for avoiding data collision provided by embodiments of the present disclosure, a radio frame generated by a first station carries a null instruction information domain. If an access point in another BSS can receive the radio frame sent from the first station, a second radio frame indicating a time for reserving a channel is sent. If a station associated with the access point receives the second radio frame, the station sets the maximum of the time as indicated in the second radio frame for reserving the channel and a locally reserved time as the NAV, and during this time, the station does not send data. This can avoid competition for channel with the first station, and thus reduce collision between BSSs, thereby ensuring the reliability of current transmission.

Other aspects of the present disclosure can become apparent after reading and understanding the detailed description below and the drawings.

This section provides a summary of various implementations or examples of the technology described in the disclosure, and is not a comprehensive disclosure of the full scope or all features of the disclosed technology.

BRIEF DESCRIPTION OF THE DRAWINGS

FIG. 10 is a schematic diagram showing a position of a null instruction information domain in a second example.

DETAILED DESCRIPTION

Implementations of the present disclosure will be described below with reference to drawings and embodiments.

It should be noted that embodiments of the present disclosure and the features in the embodiments may be combined with each other if there is no conflict, and such combinations are all within the protection scope of the present disclosure. In addition, although the logical order is shown in the flow chart, in some cases, the steps shown or described may be performed in an order different from that herein.

First Embodiment

Figure 6:
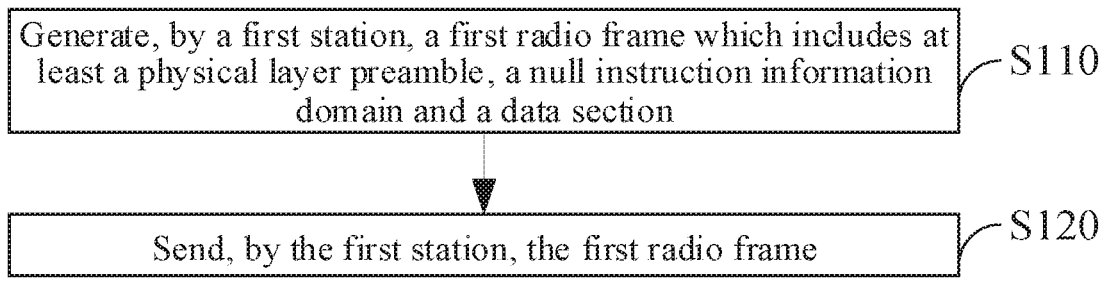
FIG. 6 is a flowchart showing a transmission control method for avoiding data collision according to a first embodiment.

FIG. 6 is a flow chart showing a transmission control method for avoiding data collision according to the first embodiment. As shown in FIG. 6, the method may include the following steps.

In S110, a first station generates a first radio frame which includes at least a physical layer preamble, a null instruction information domain and a data section. The null instruction information domain is used for triggering an access point in another basic service set which receives the first radio frame to send a second radio frame which indicates a time for reserving a channel.

In S120, the first station sends the first radio frame.

In the embodiment, the another basic service set refers to other basic service set than the basic service set which the first station belongs to. Assuming that the first station belongs to a first basic service set, other basic service set(s) than the first basic service set can be deemed as the above-mentioned "another basic service set". However, it should be noted that not all access points in other basic service sets can receive the first radio frame. For example, the first basic service set and a second basic service set are overlapping basic service sets, and the first basic service and a third basic service set are not overlapping basic service sets. For the first station, although the second and third basic service sets can be deemed as the "another basic service sets", the first radio frame cannot be received by an access point in the third basic service set. Since the working areas of the first and second basic service sets overlap, and the operating frequencies of the first and second basic service sets are the same or overlap, the radio frame sent by the first station is likely to be received by the access point in the second basic service set.

In the embodiment, no matter whether the basic service set which the first station belongs to is an OBSS, the first station can send the first radio frame. Assuming an access point X in a certain other basic service set receives the first radio frame, it is indicated that the certain basic service set and the basic service set which the first station belong to are OBSSs, there may be data collision between the station associated with the access point X and the first station. Thus, the access point X which receives the first radio needs to send the second radio frame to ensure that there will be no data collision between the associated station and the first station. If there is no access point belonging to other basic service set can receive the first radio frame, no access point will be triggered to send the second radio frame.

In the embodiment, the first station may be but not limited to a station or an access point. The destination station of the first radio frame is a second station which resides in the same basic service set with the first station. In addition to the second station, if access points of other BSSs can receive the first radio frame which is sent from the first station to the second station, the access points of the other BSSs are triggered to send the second radio frame indicating a time for reserving a channel After stations associated with the access points receive the second radio frame, the stations set the maximum of the time as indicated in the second radio frame for reserving a channel and a locally reserved time as the NAV, and during this time, the stations do not send data, thereby avoiding the collision due to the competition for channel with the first station.

According to an exemplary embodiment, the physical layer preamble in the first radio frame includes at least one of information indicating whether the null instruction information domain is carried, a length of the null instruction information domain, and a starting position of the null instruction information domain.

In other exemplary schemes, each station/access point may determine one or more of the above information by default, by pre-configuration or by convention, and it is thus not needed to include corresponding information in the physical layer preamble. For example, the first station, the second station and the access points can consider that there is a null instruction information domain in all radio frames by default, and in this way it is not needed to indicate whether the null instruction information domain is carried.

According to an exemplary embodiment, a power in the null instruction information domain is the same with or different from a power in a part of the first radio frame other than the null instruction information domain.

According to an exemplary embodiment, the null instruction information domain is invalid data for a destination station of the first radio frame.

That is to say, after the second station receives the first radio frame, the second station can discard or ignore the null instruction information domain.

According to an exemplary embodiment, the null instruction information domain is located between the physical layer preamble and the data section of the first radio frame, or between a signaling field and a short training sequence domain of the physical layer preamble of the first radio frame.

Accordingly, after the second station receives the first radio frame sent by the first station, the second station can find that the first radio frame carries the null instruction information domain, the second station starts to receive the data section after the null instruction information domain ends, or discards the received null instruction information domain and proceeds to process the subsequent data section.

The first station and the second station can determine the position of the null instruction information domain in the first radio frame by indicating in the physical layer preamble, by default, by pre-configuration, or by convention and so on.

In other exemplary schemes, the position of the null instruction information domain in the first radio frame is not limited to the above described positions and can be set appropriately.

According to an exemplary embodiment, the physical layer preamble of the first radio frame indicates duration of the first radio frame.

The indication of the duration of the first radio frame may refer to but not limited to indication of at least a stopping time of the first radio frame.

A stopping time of the time indicated by the second radio frame for reserving the channel may be the same with a stopping time of the first radio frame.

According to an exemplary embodiment, the physical layer preamble in the first radio frame indicates the time for reserving the channel.

Indication of the time for reserving the channel may refer to but not limited to indication of at least a stopping time of the time for reserving the channel.

A stopping time of the time indicated by the second radio frame for reserving the channel may be the same with a stopping time of the time indicated by the first radio frame for reserving the channel.

According to an exemplary embodiment, before step S110, the method may further include:

detecting, by the first station, a signal strength of the another basic service set, and if the signal strength of the another basic service set exceeds a first preset threshold, performing step S110.

Second Embodiment

Figure 7:
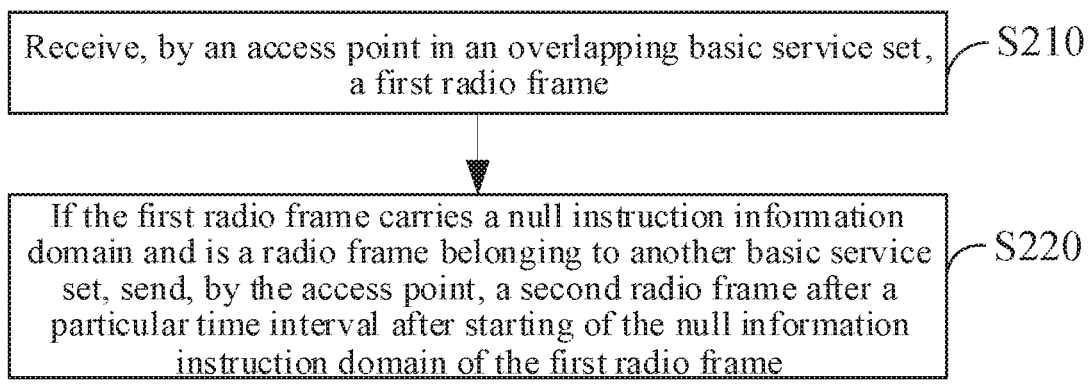
FIG. 7 is a flowchart showing a transmission control method for avoiding data collision according to a second embodiment.

FIG. 7 is a transmission control method for avoiding data collision according to the second embodiment. As shown in FIG. 7, the method includes the following steps.

In S210, an access point in an overlapping basic service set receives a first radio frame sent by a station.

In S220, if the first radio frame carries a null instruction information domain and is a radio frame belonging to another basic service set, the access point sends a second radio frame after a particular time interval after starting of the null information instruction domain of the first radio frame. The second radio frame indicates a time for reserving a channel.

In the embodiment, the another basic service set refers to other basic service set than the basic service set which the access point belongs to. For example, the station which sends the first radio frame belongs to a first basic service set, and the access point belongs to a second basic service set. If the first basic service set and the second basic service set are overlapping basic service sets, the access point is likely to receive the first radio frame. If the access point receives the first radio frame, the access point performs the above steps S210 and S220.

In the embodiment, if it is determined in S220 that the received first radio belongs to the basic service set which the access point resides in (for example, the station which sends the first radio frame also belongs to the second basic service set), the sending of the second radio frame will not be triggered by the first radio frame.

In the embodiment, the access point may be informed of the length of the particular time interval by pre-configuration, message/signaling indication and so on. The length of the particular time interval may be but not limited to SIFS.

According to an exemplary embodiment, before sending, by the access point, a second radio frame after a particular time interval after starting of the null information instruction domain of the first radio frame, the method further includes:

detecting, by the access point, a signal strength of the received first radio frame, and if the strength of the first radio frame exceeds a second preset threshold, performing the step of sending the second radio frame after a particular time interval after starting of the null information instruction domain of the first radio frame.

According to an exemplary embodiment, the second radio frame may be a radio frame of a conventional format. For example, the second radio frame may be but not limited to a CTS-TO-SELF frame or a physical layer frame (for example but not limited to, a NDP frame, a physical layer signaling frame and the like).

According to an exemplary embodiment, a stopping time of the time indicated by the second radio frame for reserving the channel is the same with a stopping time of the first radio frame, or a stopping time of the time indicated by the second radio frame for reserving the channel is the same with a stopping time of the time indicated by the first radio frame for reserving the channel.

According to an exemplary embodiment, receiving identification carried in the second radio frame is broadcast identification or identification of the access point.

In other exemplary embodiments, the receiving identification may be other particular identification.

According to an exemplary embodiment, after the station associated with the access point receives the second radio frame, if it is determined that the time indicated by the second radio frame for reserving a channel is greater than local network allocation vector of the station, the station may update the local network allocation vector using the time indicated by the second radio frame for reserving the channel.

Example 1

Figure 1:
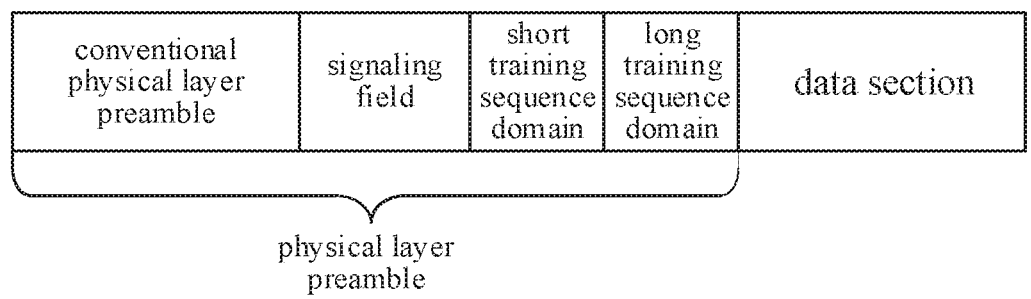
FIG. 1 is a schematic diagram showing a basic structure of a radio frame in related arts.
Figure 2:
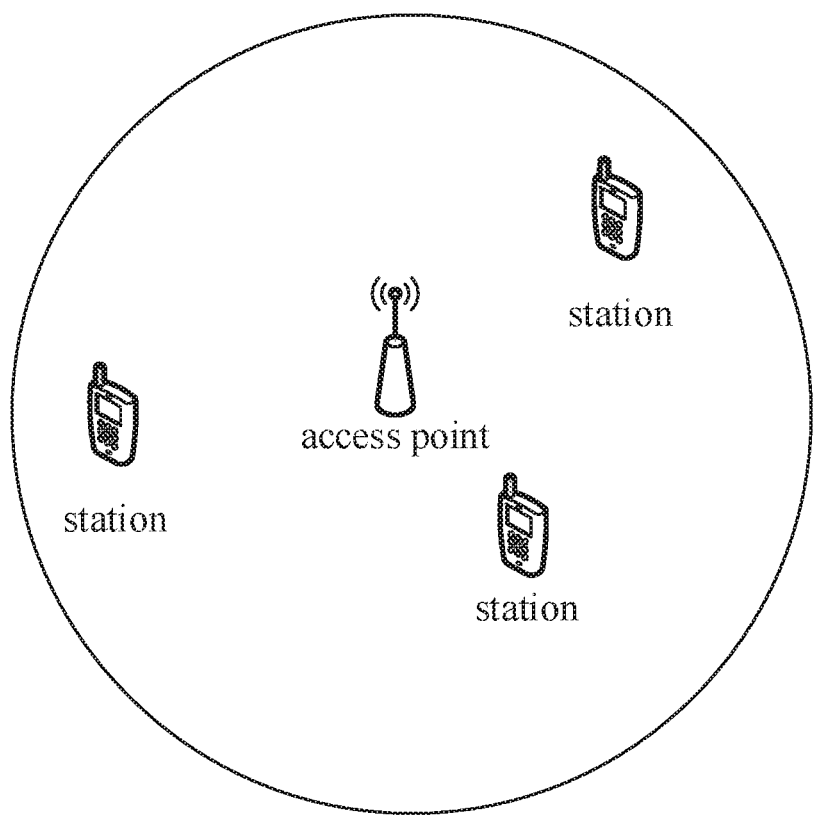
FIG. 2 is a schematic diagram showing a basic service set of WLAN in related arts.
Figure 3:
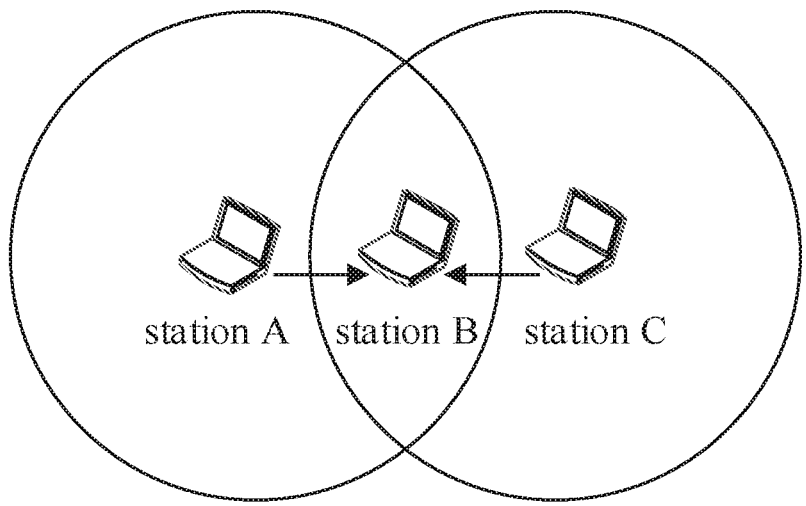
FIG. 3 is a schematic diagram showing a collision problem with a hidden station in related arts.
Figure 4:
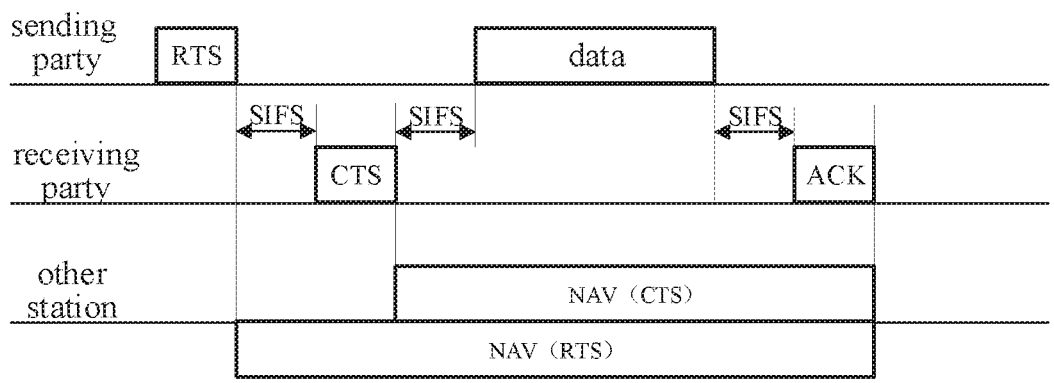
FIG. 4 is a schematic diagram showing a RTS/CTS channel protection mechanism in related arts.
Figure 5:
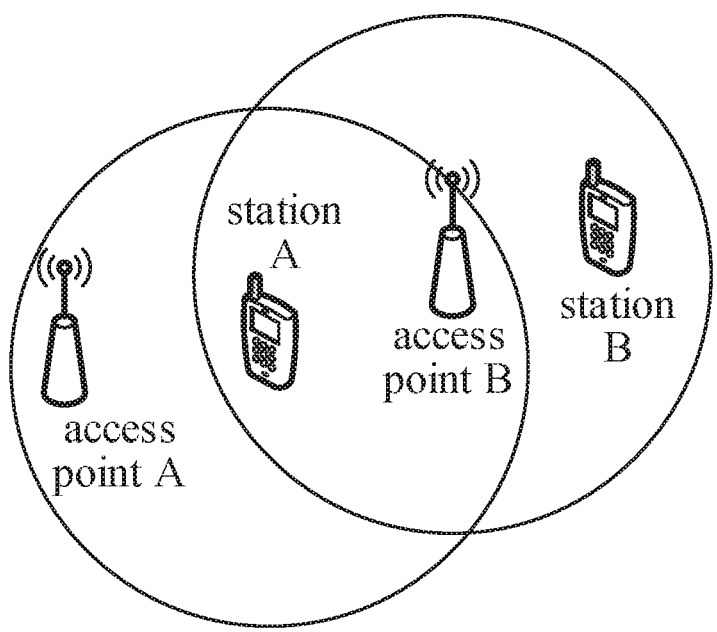
FIG. 5 is a schematic diagram showing a collision between two BSSs in related arts.

Referring to FIG. 5, an access point A and a station A belong to a basic service set A, an access point B and a station B belong to a basic service set B, and the basic service sets A and B are OBSSs.

Figure 8:
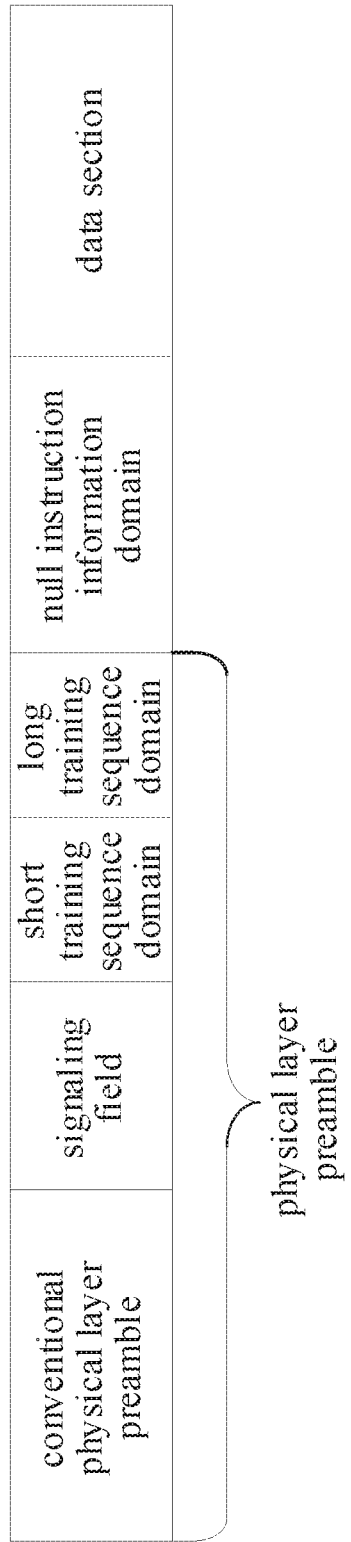
FIG. 8 is a schematic diagram showing a position of a null instruction information domain in a first example.

The station A carries the null instruction information domain in a radio frame. The station A may indicate in the physical layer preamble of the sent radio frame inclusion of the null instruction information domain, the length of the null instruction information domain and the position of the null instruction information. In the example, the position of the null instruction information domain indicated in the physical layer preamble is between the physical payer preamble and the data section, as shown in FIG. 8.

The access point A receives the radio frame sent by the station A, successfully receives the physical layer preamble, determines from the physical layer preamble that there is the null instruction information domain, and determines that the radio frame is a frame of the BSS which the access point A belongs to. The access point A continues to receive the remaining portion of the radio frame, and whether the null instruction information domain is right or wrong does not influence the determination as to whether the other portion of the radio frame is correctly received.

Figure 9:
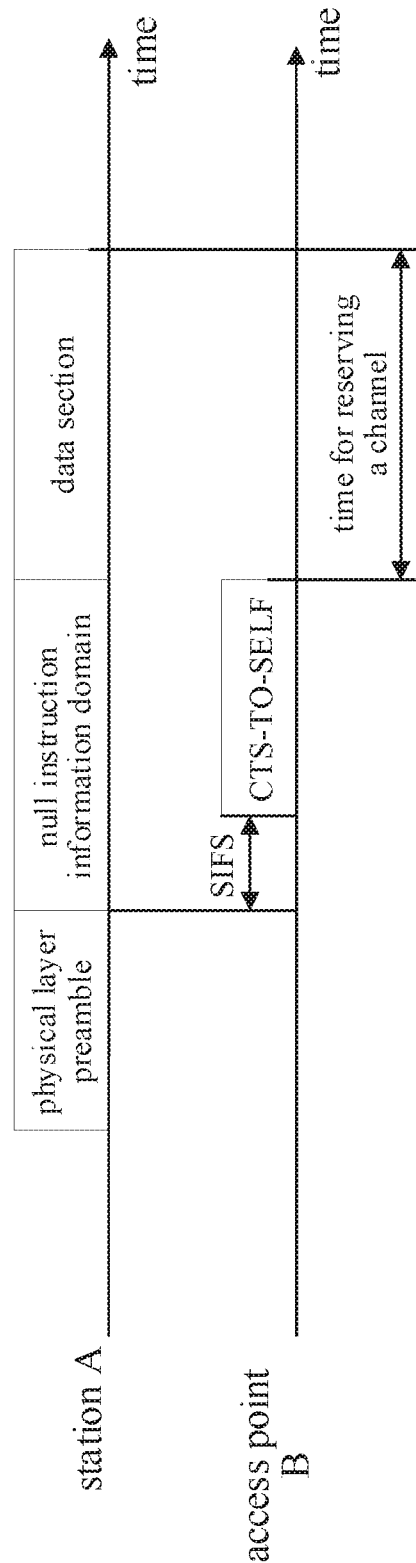
FIG. 9 is a schematic diagram showing frame exchange and channel reservation in the first, third and fourth examples.

The access point B receives the radio frame sent by the station A, successfully receives the physical layer preamble, determines from the physical layer preamble that there is the null instruction information domain, and determines that the radio frame is and OBSS frame (that is, the radio frame is a radio frame which belongs to another basic service set) and the strength of the radio frame exceeds a second preset threshold. After SIFS from the starting time point of the null instruction information domain, the access point B sends a CTS-TO-SELF frame, the receiving identification of the CTS-TO-SELF frame is set as the identification of the access point B, and a time for reserving the channel is indicated in the CTS-TO-SELF frame. A stopping time of the time for reserving the channel is the same with the stopping time of the radio frame sent by the station A, as shown in FIG. 9.

The station B successfully receives the CTS-TO-SELF frame sent by the access point B, the time for reserving the channel indicated by the CTS-TO-SELF frame is greater than a local network allocation vector of the station, the station B updates the local network allocation vector using the time for reserving the channel as indicated by the CTS-TO-SELF frame.

Example 2

Referring to FIG. 5, an access point A and a station A belong to a basic service set A, an access point B and a station B belong to a basic service set B, and the basic service sets A and B are OBSSs.

The station A determines that the signal of the access point B exceeds a first preset threshold, the station A carries the null instruction information domain in the sent radio frame. The station A may indicate in the physical layer preamble of the sent radio frame inclusion of the null instruction information domain, the length of the null instruction information domain and the position of the null instruction information. In the example, the position of the null instruction information domain indicated in the physical layer preamble is between the signaling field and the short training sequence domain, as shown in FIG. 10.

Figure 11:
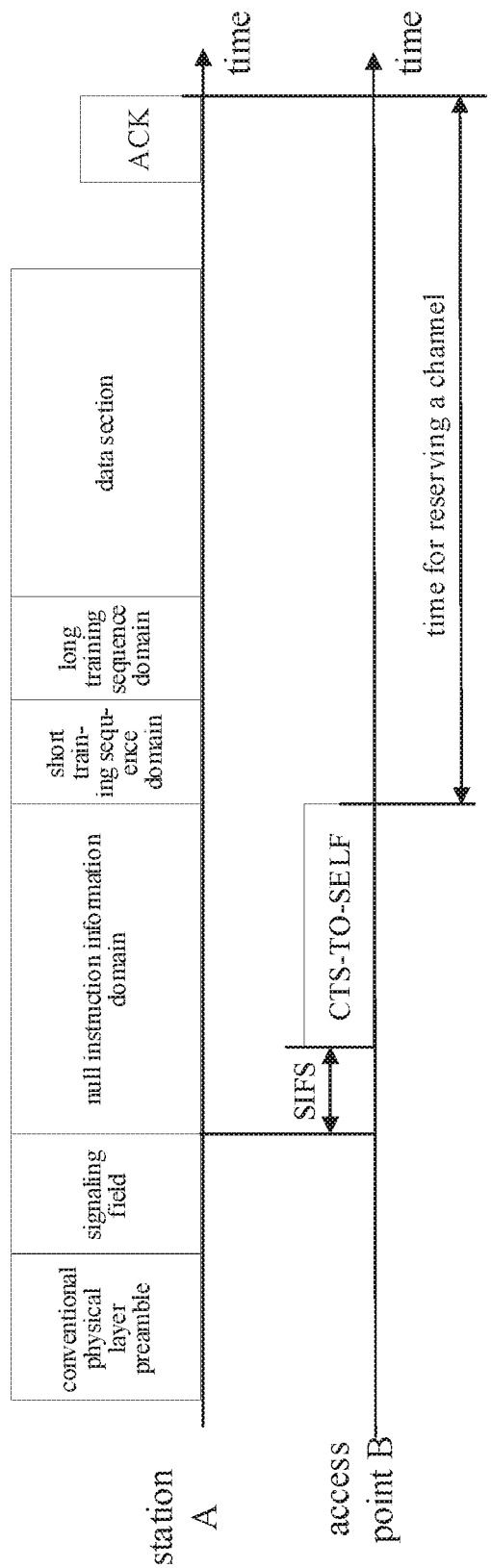
FIG. 11 is a schematic diagram showing frame exchange and channel reservation in the second example.

The access point B receives the radio frame sent by the station A, successfully receives the physical layer preamble, determines from the physical layer preamble that there is the null instruction information domain, and determines that the radio frame is an OBSS frame. After SIFS from the starting time point of the null instruction information domain, the access point B sends a CTS-TO-SELF frame, the receiving identification of the CTS-TO-SELF frame is set as the identification of the access point B, and a time for reserving the channel is indicated in the CTS-TO-SELF frame. A stopping time of the time for reserving the channel as indicated in the CTS-TO-SELF frame is the same with the stopping time of the time for reserving the channel as indicated in the radio frame sent by the station A, as shown in FIG. 11.

The station B successfully receives the CTS-TO-SELF frame sent by the access point B, the time for reserving the channel indicated by the CTS-TO-SELF frame is greater than a local network allocation vector of the station, the station B updates the local network allocation vector using the time for reserving the channel as indicated by the CTS-TO-SELF frame.

Example 3

Figure 12:
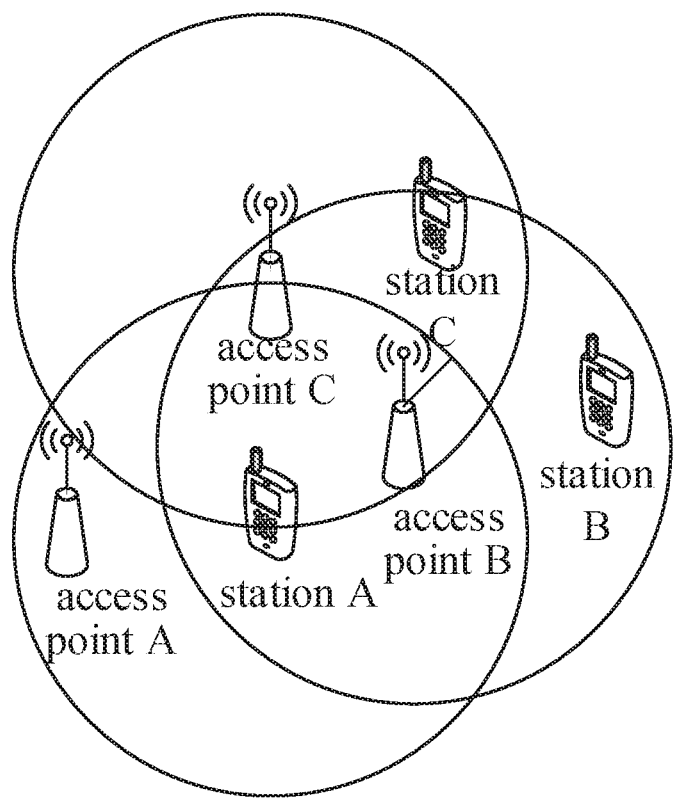
FIG. 12 is a schematic diagram showing an arrangement of three BSSs in the third example.

Referring to FIG. 12, an access point A and a station A belong to a basic service set A, an access point B and a station B belong to a basic service set B, an access point C and a station C belongs to a basic service set C, and the basic service sets A, B and C are OBSSs.

The station A determines that the signal of the access point B exceeds a first preset threshold, the station A carries the null instruction information domain in the sent radio frame. The null instruction information domain is between the physical layer preamble and the data section, as shown in FIG. 8. The station A may indicate in the physical layer preamble of the sent radio frame the presence and length of the null instruction information domain. Also, the station A carries a time for reserving a channel in the physical layer preamble.

The access point B receives the radio frame sent by the station A, successfully receives the physical layer preamble, determines from the physical layer preamble that there is the null instruction information domain, and determines that the radio frame is an OBSS frame and the signal of the radio frame exceeds a second preset threshold. After SIFS from the starting time point of the null instruction information domain, the access point B sends a CTS-TO-SELF frame, the receiving identification of the CTS-TO-SELF frame is set as the identification of the access point B, and a time for reserving the channel is carried in the CTS-TO-SELF frame. A stopping time of the time for reserving the channel is the same with the stopping time of the radio frame sent by the station A, as shown in FIG. 9.

The access point C receives the radio frame sent by the station A, successfully receives the physical layer preamble, determines from the physical layer preamble that there is the null instruction information domain, and determines that the radio frame is an OBSS frame but the signal of the radio frame does not exceed the second preset threshold. The access point C does not send a CTS-TO-SELF frame after SIFS from the starting time point of the null instruction information domain.

The station B successfully receives the CTS-TO-SELF frame sent by the access point B and determines that the CTS-TO-SELF frame is a radio frame sent from an access point of the BSS which the station B belongs to, the station B updates the NAV of the station itself using the time for reserving the channel as indicated by the CTS-TO-SELF frame.

The station C successfully receives the CTS-TO-SELF frame sent by the access point B and determines that the CTS-TO-SELF frame is not a radio frame sent from an access point of the BSS which the station C belongs to, the station C does not update the network allocation vector of the station itself.

Example 4

Figure 13:
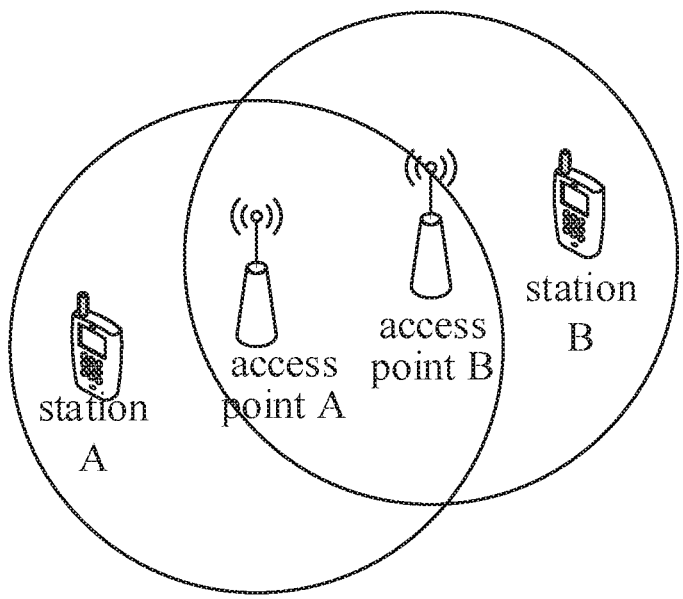
FIG. 13 is a schematic diagram showing an arrangement of two BSSs in the fourth and fifth examples.

Referring to FIG. 13, an access point A and a station A belong to a basic service set A, and an access point B and a station B belong to a basic service set B, and the basic service sets A and B are OBSSs.

The access point A carries the null instruction information domain in the sent radio frame. The null instruction information domain is between the physical layer preamble and the data section as shown in FIG. 8. The station A also indicates in the physical layer preamble of the radio frame the presence and length of the null instruction information domain.

The access point B receives the radio frame sent by the station A, successfully receives the physical layer preamble, determines from the physical layer preamble that there is the null instruction information domain, and determines that the radio frame is an OBSS frame and the signal strength of the radio frame exceeds a second preset threshold. After SIFS from the starting time point of the null instruction information domain, the access point B sends a CTS-TO-SELF frame, the receiving identification of the CTS-TO-SELF frame is set as the identification of the access point B, and a time for reserving the channel is carried in the CTS-TO-SELF frame. A stopping time of the time for reserving the channel is the same with the stopping time of the radio frame sent by the station A, as shown in FIG. 9.

The station B successfully receives the CTS-TO-SELF frame sent by the access point B and determines that the CTS-TO-SELF frame is a radio frame sent from an access point of the BSS which the station B belongs to, the time for reserving the channel as indicated by the CTS-TO-SELF frame is greater than the local network allocation vector of the station, and the station B updates the local network allocation vector of the station itself using the time for reserving the channel as indicated by the CTS-TO-SELF frame.

Example 5

Referring to FIG. 13, an access point A and a station A belong to a basic service set A, and an access point B and a station B belong to a basic service set B.

The access point A carries the null instruction information domain in the sent radio frame. The null instruction information domain is between the physical layer preamble and the data section as shown in FIG. 8. The station A also indicates in the physical layer preamble of the radio frame the presence and length of the null instruction information domain.

Figure 14:
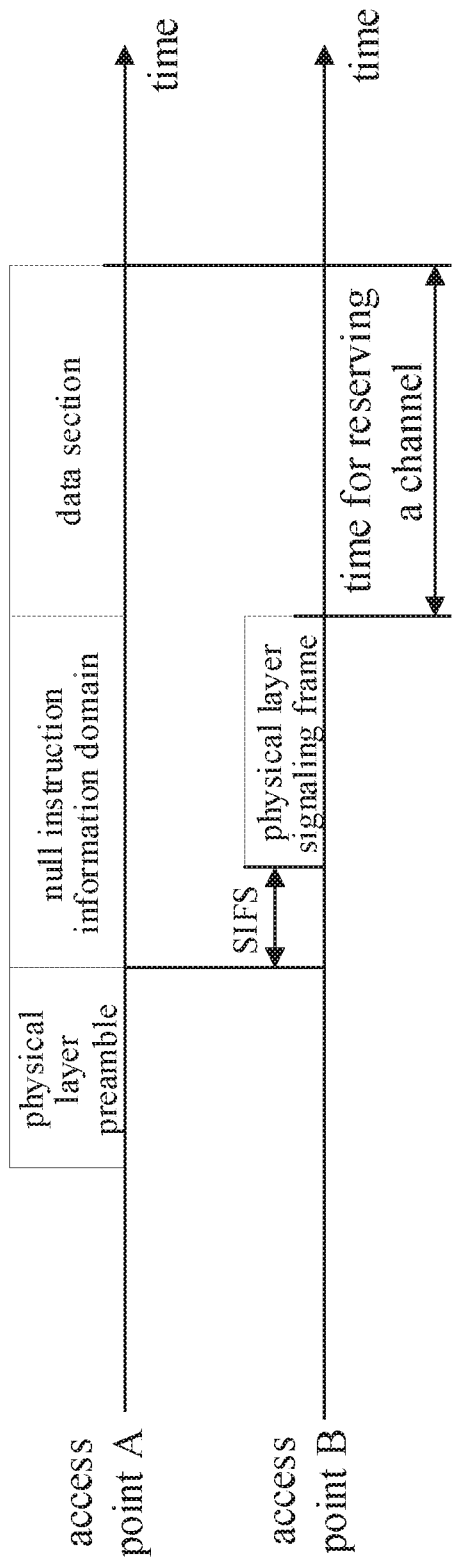
FIG. 14 is a schematic diagram showing frame exchange and channel reservation in the fifth example.

The access point B receives the radio frame sent by the station A, successfully receives the physical layer preamble, determines from the physical layer preamble that there is the null instruction information domain, and determines that the radio frame is an OBSS frame and the signal strength of the radio frame exceeds a second preset threshold. After SIFS from the starting time point of the null instruction information domain, the access point B sends a physical layer signaling frame (the physical layer signaling frame refers to a physical layer frame not including upper layer information), the receiving identification of the physical layer signaling frame is set as the identification of the access point B, and a time for reserving the channel is carried in the physical layer signaling frame. A stopping time of the time for reserving the channel is the same with the stopping time of the radio frame sent by the station A, as shown in FIG. 14.

The station B successfully receives the physical layer signaling frame sent by the access point B and determines that the physical layer signaling frame is a radio frame sent from an access point of the BSS which the station B belongs to, the time for reserving the channel as indicated by the physical layer signaling frame is not greater than the local network allocation vector of the station, and the station B does not update the local network allocation vector of the station itself using the time for reserving the channel as indicated by the physical layer signaling frame.

Third Embodiment

Figure 15:
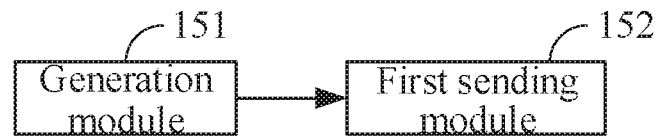
FIG. 15 is a block diagram showing a transmission control device for avoiding data collision according to a third embodiment.

FIG. 15 is a block diagram showing a transmission control device for avoiding data collision according to the third embodiment. The device is provided in a first station. As shown in FIG. 15, the device includes a generation module 151 and a first sending module 152.

The generation module 151 is configured to generate a first radio frame which includes a physical layer preamble, a null instruction information domain and a data section. The null instruction information domain is used for triggering an access point in another basic service set which receives the first radio frame to send a second radio frame which indicates a time for reserving a channel.

The first sending module 152 is configured to send the first radio frame.

According to an exemplary embodiment, the physical layer preamble in the first radio frame includes at least one of information indicating whether the null instruction information domain is carried, a length of the null instruction information domain, and a starting position of the null instruction information domain.

According to an exemplary embodiment, a power in the null instruction information domain is the same with or different from a power in a part of the first radio frame other than the null instruction information domain.

According to an exemplary embodiment, the null instruction information domain is invalid data for a destination station of the first radio frame.

According to an exemplary embodiment, the null instruction information domain is located between the physical layer preamble and the data section of the first radio frame, or between a signaling field and a short training sequence domain of the physical layer preamble of the first radio frame.

According to an exemplary embodiment, the physical layer preamble of the first radio frame indicates duration of the first radio frame;
a stopping time of the time indicated by the second radio frame for reserving the channel is the same with a stopping time of the first radio frame.

According to an exemplary embodiment, the physical layer preamble in the first radio frame indicates the time for reserving the channel;
a stopping time of the time indicated by the second radio frame for reserving the channel is the same with a stopping time of the time indicated by the first radio frame for reserving the channel.

Figure 16:
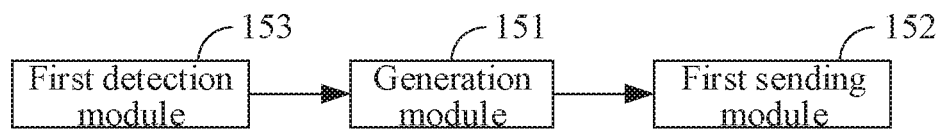
FIG. 16 is a block diagram showing a transmission control device according to an optional solution of the third embodiment.

According to an exemplary embodiment, as shown in FIG. 16, the device may further include a first detection module 153.

The first detection module 153 is configured to detect a signal strength of the another basic service set.

The generation module 151 is configured to, if the signal strength of the another basic service set exceeds a first preset threshold, perform the operation of generating the first radio frame.

Figure 17:
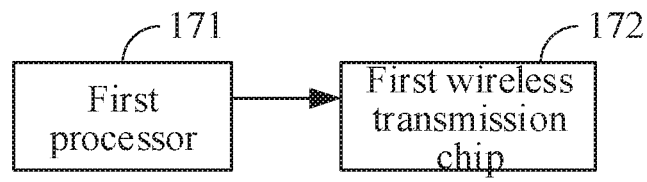
FIG. 17 is a schematic diagram showing hardware of the optional solution of the third embodiment.

According to an exemplary embodiment, the generation module and the first detection module may be implemented by codes running in a first processor 171 which may be but not limited to a Microcontroller Unit, and the first sending module may be implemented by a first wireless transmission chip 172, as shown in FIG. 17.

Other details regarding the devices can be found in the descriptions in connection with the first embodiment.

Fourth Embodiment

Figure 18:
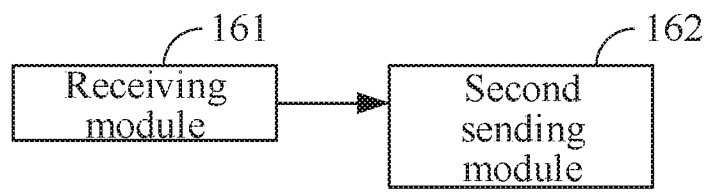
FIG. 18 is a block diagram showing a transmission control device for avoiding data collision according to a fourth embodiment.
Figure 19:
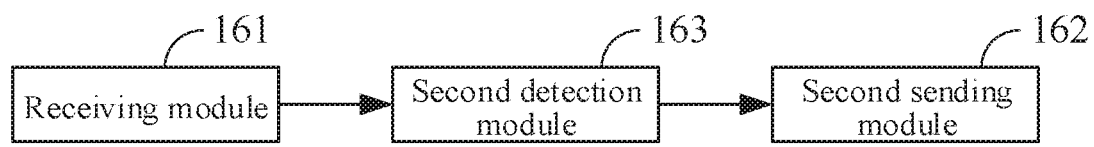
FIG. 19 is a block diagram showing a transmission control device according to an optional solution of the fourth embodiment.

FIG. 18 is a block diagram showing a transmission control device for avoiding data collision according to the fourth embodiment. The device is provided in an access point in an OBSS. As shown in FIG. 18, the device includes a receiving module 161 and a second sending module 162.

The receiving module 161 is configured to receive a first radio frame sent by a station.

The second sending module 162 is configured to, if the first radio frame carries a null instruction information domain and is a radio frame belonging to another basic service set, send a second radio frame after a particular time interval after starting of the null information instruction domain of the first radio frame. The second radio frame indicates a time for reserving a channel.

According to an exemplary embodiment, as shown in FIG. 18, the device may further includes a second detection module 163.

The second detection module 163 is configured to detect a signal strength of the received first radio frame.

The second sending module 162 is configured to, if the strength of the first radio frame exceeds a second preset threshold, perform the operation of sending the second radio frame after a particular time interval after starting of the null information instruction domain of the first radio frame.

According to an exemplary embodiment, the second radio frame is a CTS-TO-SELF frame.

According to an exemplary embodiment, the second radio frame is a physical layer signaling frame.

According to an exemplary embodiment, a stopping time of the time indicated by the second radio frame for reserving the channel is the same with a stopping time of the first radio frame, or a stopping time of the time indicated by the second radio frame for reserving the channel is the same with a stopping time of the time indicated by the first radio frame for reserving the channel.

According to an exemplary embodiment, receiving identification carried in the second radio frame is broadcast identification or identification of the access point.

Figure 20:
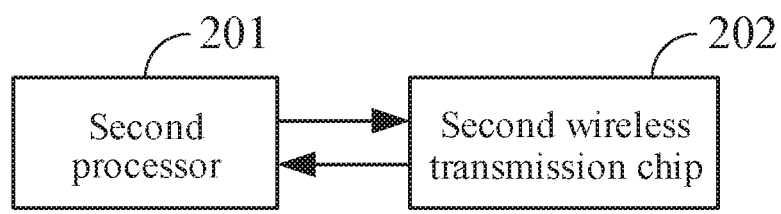
FIG. 20 is a schematic diagram showing hardware of the optional solution of the fourth embodiment.

According to an exemplary embodiment, the second detection module can be implemented by codes running in a second processor 201 which may be but not limited to a MCU, the receiving module 161 may be implemented by a second wireless transmission chip 202, the determination function of the second sending module 162 may be implemented by codes running in the second processor 201, and the sending operation may be implemented by the second wireless transmission chip 202, as shown in FIG. 20.

Other details regarding the devices can be found in the descriptions in connection with the second embodiment.

An embodiment of the present disclosure further provide a computer readable storage medium for storing computer executable instructions which, when executed by a processor, cause the processor to perform the above described transmission control methods for avoiding data collision.

A person of ordinary skill in the art may understand that all or part of the steps in the foregoing methods may be implemented by a program instructing relevant hardware, and the program may be stored in a computer-readable storage medium, such as a read-only memory, a magnetic disk, or an optical disk and so on. Optionally, all or part of the steps of the above embodiments may also be implemented by using one or more integrated circuits. Correspondingly, each module/unit in the above embodiments can be implemented in the form of hardware, or can be implemented in the form of software function modules. The embodiments of the present disclosure are not limited to any particular combination of hardware and software.

Although the embodiments of the present disclosure are described above, the contents described above are merely exemplary implementations provided to facilitate understanding of the present disclosure, and are not intended to limit the present disclosure. Any modifications and variations in the implementation and details of the present disclosure may be made by those skilled in the art without departing from the spirit and scope of the present disclosure. The scope of the present patent application should be defined by the appending claims.

INDUSTRIAL APPLICABILITY

In the transmission control methods and devices for avoiding data collision provided by embodiments of the present disclosure, a radio frame generated by a first station carries a null instruction information domain. If an access point in another BSS can receive the radio frame sent from the first station, a second radio frame indicating a time for reserving a channel is sent. If a station associated with the access point receives the second radio frame, the station sets the maximum of the time as indicated in the second radio frame for reserving the channel and a locally reserved time as the NAV, and during this time, the station does not send data. This can avoid competition for channel with the first station, and thus reduce collision between BSSs, thereby ensuring the reliability of current transmission.

What is claimed is:

1. A transmission control method for avoiding data collision, comprising:
   generating, by a first station in a first basic service set, a first radio frame comprising a physical layer preamble, a null instruction information domain and a data section, wherein the null instruction information domain is used for triggering an access point, which is in a second basic service set other than the first basic service set and has received the first radio frame, to send a second radio frame indicating a first time for reserving a channel; and
   sending, by the first station, the first radio frame so that the access point which is in the second basic service set and has received the first radio frame sends the second radio frame after a particular time interval after starting of the null information instruction domain of the first radio frame to a second station associated with the access point in the second basic service set to indicate the second station not sending data through the reserved channel during the first time.

2. The method according to claim 1, wherein the physical layer preamble in the first radio frame comprises at least one of information indicating whether the null instruction information domain is carried, a length of the null instruction information domain, and a starting position of the null instruction information domain.

3. The method according to claim 1, wherein the null instruction information domain is discarded or ignored by a destination station of the first radio frame; wherein the destination station of the first radio frame resides in the first basic service set.

4. The method according to claim 1, wherein the null instruction information domain is located between the physical layer preamble and the data section of the first radio frame, or between a signaling field and a short training sequence domain of the physical layer preamble of the first radio frame.

5. The method according to claim 1, wherein the physical layer preamble of the first radio frame indicates duration of the first radio frame;
   wherein a stopping time of the first time indicated by the second radio frame for reserving the channel is the same with a stopping time of the first radio frame.

6. The method according to claim 1, wherein the physical layer preamble in the first radio frame indicates a second time for reserving the channel;
   wherein a stopping time of the first time indicated by the second radio frame for reserving the channel is the same with a stopping time of the second time indicated by the first radio frame for reserving the channel.

7. The method according to claim 1, wherein before the generation of the first radio frame by the first station, the method further comprises:
   detecting, by the first station, a signal strength of the second basic service set, and determining, by the first station, the signal strength of the second basic service set exceeds a preset threshold.

8. A transmission control method for avoiding data collision, comprising:
   receiving, by an access point in a second basic service set, a first radio frame generated and sent by a first station in a first basic service set; wherein the first radio frame comprises a physical layer preamble, a null instruction information domain and a data section, and the null instruction information domain is used for triggering the access point, which is in the second basic service set other than the first basic service set and has received the first radio frame, to send a second radio frame indicating a first time for reserving a channel; and sending, by the access point in the second basic service set, the second radio frame after a particular time interval after starting of the null information instruction domain of the first radio frame to a second station associated with the access point in the second basic service set to indicate the second station not sending data through the reserved channel during the first time.

9. The method according to claim 8, wherein before sending, by the access point, the second radio frame after the particular time interval after starting of the null information instruction domain of the first radio frame to the second station, the method further comprises:

detecting, by the access point, a signal strength of the received first radio frame, and determining, by the access point, the strength of the first radio frame exceeds a preset threshold.

10. The method according to claim 8, wherein the second radio frame is a CTS-TO-SELF frame.

11. The method according to claim 8, wherein the second radio frame is a physical layer frame.

12. The method according to claim 8, wherein a stopping time of the first time indicated by the second radio frame for reserving the channel is the same with a stopping time of the first radio frame, or a stopping time of the first time indicated by the second radio frame for reserving the channel is the same with a stopping time of a second time indicated by the first radio frame for reserving the channel.

13. The method according to claim 8, wherein receiving identification carried in the second radio frame is broadcast identification or identification of the access point.

14. A transmission control device for avoiding data collision, provided in a first station in a first basic service set, comprising:

a processor; and
a memory storing instructions executable by the processor;
wherein the processor is configured to:
generate a first radio frame comprising a physical layer preamble, a null instruction information domain and a data section, wherein the null instruction information domain is used for triggering an access point, which is in a second basic service set other than the first basic service set and has received the first radio frame, to send a second radio frame indicating a time for reserving a channel; and the transmission control device further comprises a wireless transmission chip configured to send the first radio frame so that the access point which is in the second basic service set and has received the first radio frame sends the second radio frame after a particular time interval after starting of the null information instruction domain of the first radio frame to a second station associated with the access point in the second basic service set to indicate the second station not sending data through the reserved channel during the time.

15. The device according to claim 14, wherein the processor is further configured to detect a signal strength of the second basic service set; and
determine the signal strength of the second basic service set exceeds a preset threshold.

16. A transmission control device for avoiding data collision, provided in an access point in a second basic service set, comprising:

a processor;
a memory storing instructions executable by the processor; and
a wireless transmission chip configured to receive a first radio frame generated and sent by a first station in a first basic service set; wherein the first radio frame comprises a physical layer preamble, a null instruction information domain and a data section, and the null instruction information domain is used for triggering the access point, which is in the second basic service set other than the first basic service set and has received the first radio frame, to send a second radio frame indicating a time for reserving a channel;
wherein the processor is configured to:
instruct the wireless transmission chip to send the second radio frame after a particular time interval after starting of the null information instruction domain of the first radio frame to a second station associated with the access point in the second basic service set to indicate the second station not sending data through the reserved channel during the time.

17. The device according to claim 16, wherein the processor is further configured to detect a signal strength of the received first radio frame; and
determine the strength of the first radio frame exceeds a preset threshold.

* * * * *